United States Patent
Iliadis

(10) Patent No.: US 6,731,608 B2
(45) Date of Patent: May 4, 2004

(54) COMPLEX NODE REPRESENTATIONS IN PNNI SYSTEMS

(75) Inventor: Ilias Iliadis, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 09/772,374

(22) Filed: Jan. 30, 2001

(65) Prior Publication Data

US 2001/0015958 A1 Aug. 23, 2001

(30) Foreign Application Priority Data

Feb. 3, 2000 (EP) .......................................... 00102347

(51) Int. Cl.$^7$ ............................................. H04L 12/28
(52) U.S. Cl. ........................ 370/256; 370/252; 370/463
(58) Field of Search ................. 370/256, 252, 370/463

(56) References Cited

U.S. PATENT DOCUMENTS 6,680,917 B1 * 1/2003 Seaman ...................... 370/256
6,628,624 B1 * 9/2003 Mahajan et al. ............. 370/256

* cited by examiner

Primary Examiner—John Pezzlo
(74) Attorney, Agent, or Firm—Douglas W. Cameron; Anne V. Dougherty

(57) ABSTRACT

Systems involving generation of a complex node representation of a PNNI peer group are provided. Use is made of a set of restrictive costs, such as a transition matrix, defining the restrictive costs of paths between pairs of border nodes of the peer group. The complex node representation generation method is based on the group evolution process of the logical group representation of a peer group, and use is also made of the spanning tree representation of a network. Complex node representations generated by the disclosed methods are optimal in that they contain the minimum possible number of exception bypasses.

19 Claims, 7 Drawing Sheets

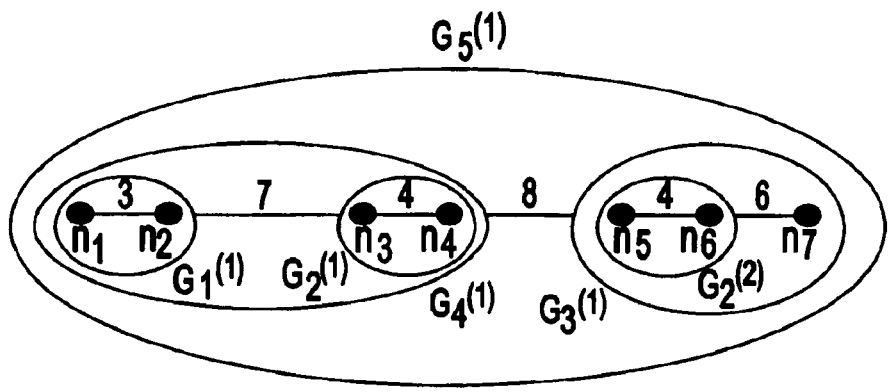

FIG.9

$C_1 = 3$, $G_1^{(1)} = \{n_1, n_2\}$, $B_{min}(G_1^{(1)}) = 0$

FIG.10a $\quad R_{min}(G_1^{(1)}) : \underset{n_1}{\bullet} \overset{x}{\rule{2em}{0.4pt}} \bullet \overset{3}{\rule{2em}{0.4pt}} \underset{n_2}{\bullet} \quad (x \leq 3)$ $C_2 = 3$, $G_2^{(1)} = \{n_3, n_4\}$, $B_{min}(G_2^{(1)}) = 0$ $R_{min}(G_2^{(1)}) : \underset{n_3}{\bullet} \overset{y}{\rule{2em}{0.4pt}} \bullet \overset{4}{\rule{2em}{0.4pt}} \underset{n_4}{\bullet} \quad (y \leq 4)$ $G_2^{(2)} = \{n_5, n_6\}$, $B_{min}(G_2^{(2)}) = 0$ FIG.10b $\quad R_{min}(G_2^{(2)}) : \underset{n_5}{\bullet} \overset{z}{\rule{2em}{0.4pt}} \bullet \overset{4}{\rule{2em}{0.4pt}} \underset{n_6}{\bullet} \quad (z \leq 4)$ $C_3 = 6$, $G_3^{(1)} = G_2^{(2)} \cup \{n_7\} = \{n_5, n_6, n_7\}$ $B_{min}(G_3^{(1)}) = \min\{B_{min}(G_2^{(2)}) + 0, 0 + 1\} = 0$ $R_{min}(G_3^{(1)})$ :

$(z \leq 4)$ $C_4 = 7$, $G_4^{(1)} = G_1^{(1)} \cup G_2^{(1)} = \{n_1, n_2, n_3, n_4\}$ $B_{min}(G_4^{(1)}) = \min\{B_{min}(G_1^{(1)}) + 1, B_{min}(G_2^{(1)}) + 1\} = 1$ $R_{min}(G_4^{(1)})$ :

$(x \leq 3)$
$(w \geq 7)$ $$C_5 = 8, \ G_5^{(1)} = G_3^{(1)} \cup G_4^{(1)} = \{n_1, n_2, n_3, n_4, n_5, n_6, n_7\}$$
$$B_{min}(G_5^{(1)}) = \min\{B_{min}(G_3^{(1)}) + (4-1), \ B_{min}(G_4^{(1)}) + (3-1)\} = 1$$
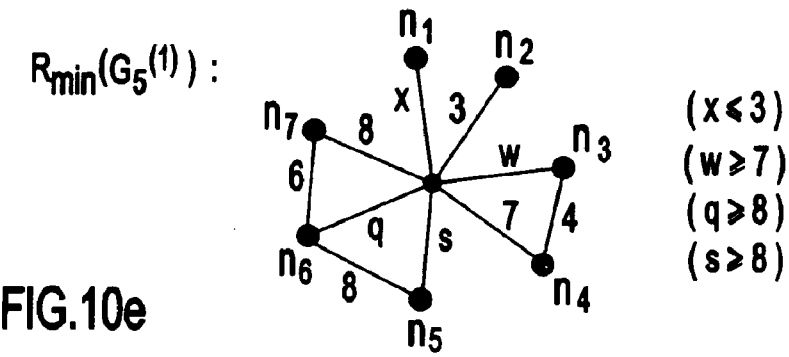
FIG.10e
FIG.11
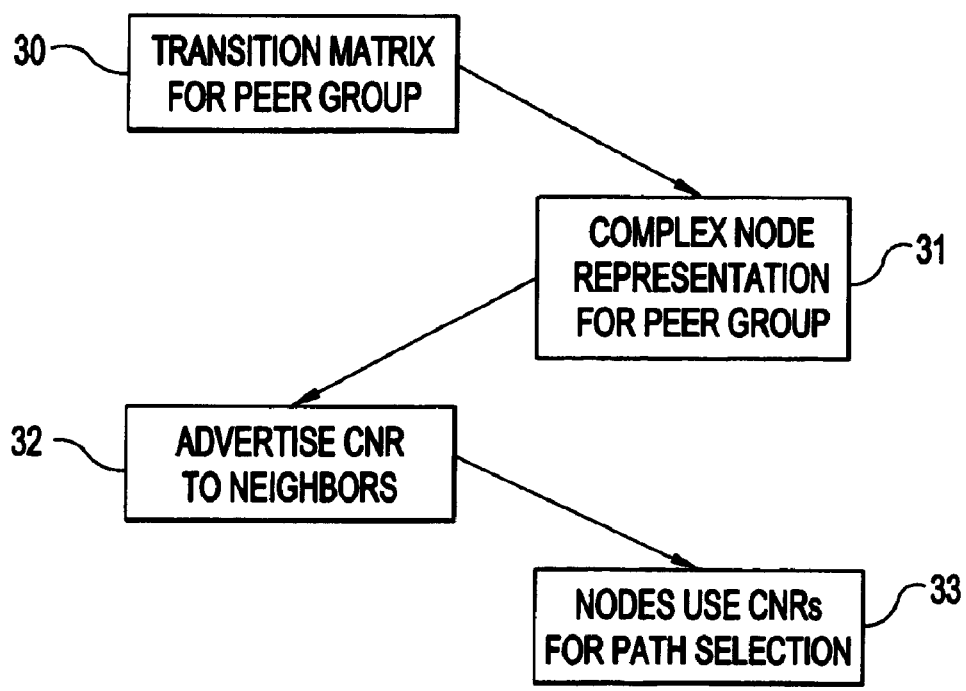

COMPLEX NODE REPRESENTATIONS IN PNNI SYSTEMS

FIELD OF THE INVENTION

This invention relates generally to complex node representations in PNNI network systems. Particular embodiments of the invention provide methods and apparatus for generating complex node representations of PNNI peer groups.

BACKGROUND OF THE INVENTION

PNNI (Private Network-to-Network Interface) is a hierarchical, dynamic link-state routing protocol defined by the ATM (Asynchronous Transfer Mode) Forum for use in ATM networks. The hierarchy extension and the use of a single routing protocol at all levels of the hierarchy allow the support for large-scale ATM networks. Among the major characteristics of the protocol are signaling for switched virtual circuits (SVCs), dynamic routing capabilities, and support for quality of service (QoS) parameters. A key feature of the protocol is the ability to cluster network nodes into manageable groups called "peer groups". One node in each peer group serves as the "peer group leader" and represents that peer group as a single logical node (a "logical group node") in the next layer up of the hierarchy. This concept is illustrated schematically in FIG. 1 of the accompanying drawings. In the figure, a peer group A in PNNI layer k consists of four nodes A1, A2, A3 and A4. Three of these nodes, nodes A1, A2 and A3, are border nodes. Each border node has a link connecting peer group A to another peer group (not explicitly shown in layer k), here peer groups B, C and D respectively. The topology in layer k is abstracted in the next layer up of the hierarchy, ie. layer k+1, such that each layer k peer group is represented as a single logical node in layer k+1. Thus peer group A is represented by node A in layer k+1, peer group B is represented by node B in layer k+1, and so on. In the figure, nodes A, B, C and D themselves form a peer group in layer k+1.

ATM is a source routing technology. To enable source route computation and to support end-to-end QoS (for example the required bandwidth), the nodes must maintain information about the network topology. PNNI thus defines a system for the creation and distribution of topology data within a network. Topology data is exchanged automatically by network nodes on a regular basis or upon significant changes to network topology so that each node maintains an up-to-date view of the network. The topology data is defined by PNNI Topology State Elements PTSE's) which are created and distributed by nodes so that each node can maintain a topology database which defines its view of the network. This allows nodes to select paths for routing calls through the network, and to perform alternative routing in the case of link failure. PTSE's include data defining topology characteristics derived from link or node state parameters. PTSE's are flooded among nodes in a peer group so that each peer group node has the same topology database and thus the same view of the network. In the next level up of the hierarchy, however, the peer group topology is abstracted as described above, so that only the abstracted topology is seen by nodes sharing a peer group at this level. It is this topology abstraction that reduces the resources required to define very large networks.

The topology data required for path selection and routing may include not only details of the layout of nodes and links but also QoS parameters as mentioned above. For example, a call to be routed over the network may require a certain bandwidth. In this case, knowledge of the bandwidth of links in the network is required to determine if a call can be connected successfully. To allow such parameters to be taken into account, "costs" can be associated with links and paths in the network. The cost of a link is expressed as an arbitrary value determined as some function of the parameter, eg. bandwidth, about which knowledge is required. Whatever the particular function employed, according to convention it is usual for the cost to be defined such that the lower the cost the better the link. In the case of bandwidth, for example, the cost C of a link may be defined as C=1/bandwidth. A path in the network, involving multiple links, can be measured by a "restrictive cost". According to the definition of restrictive cost, the weakest link in a path defines the restrictive cost of the path. Thus, when convention is followed such that a higher cost corresponds to a weaker link, the restrictive cost of a path will be determined by the maximum of the costs of the constituent links.

To allow such costs to be taken into account in the path selection process in spite of the hierarchical topology abstraction described above, PNNI provides a way to represent a peer group as a logical group node which has a more sophisticated structure than a single node. The two ways of representing a PNNI peer group in a higher layer are illustrated in FIG. 2 of the accompanying drawings. The left-hand side of the figure shows an example of the "simple node" representation, and the right-hand side shows an example of the "complex node" representation. The simple node representation shows the peer group as a single node A having ports P1, P2 and P3 connecting the node to external links, ie. links to neighboring peer groups. The simple node representation is simple to construct and use but does not give information about the cost of traversing the peer group. As discussed further below, a peer group can be modeled by an orientated graph in which a node of the peer group is referenced as a vertex of the graph, and a link between nodes is referenced as an edge between two vertices of the graph. The principle of the complex node representation is to map the simple node to a representation where:

the nucleus 1 is a vertex representing the node itself;

the nucleus 1 is connected via spokes 2 to a set of vertices P1, P2 and P3 each representing a port in the simple node representation; and optionally, vertices representing ports can be directly connected by "exception bypasses" 3.

The complex node representation is derived using a set of restrictive costs for the peer group which is usually presented in the form of a cost matrix known as the "transition matrix" for the peer group. The transition matrix defines the restrictive costs of paths between all pairs of border nodes in the peer group. Where there is more than one path between a given pair of border nodes, then ideally the optimal (lowest-cost) path determines the entry in the transition matrix. The complex node representation, derived on the basis of the transition matrix, indicates the cost of traversing the peer group, and therefore allows such costs to be taken onto account for path selection and other purposes.

The drawback of using the complex node representation is the increased processing complexity involved in generating the complex node representation and using this representation when computing routes (since there are more vertices and edges in the graph representing the network as a whole than in the case of the simple node representation). It is therefore desirable to provide an efficient method for generating the complex node representation and for the resulting complex node representation itself to be optimized as far as possible. In particular, there may be many possible complex node representations corresponding to a given transition matrix and hence a given peer group. In general it will be desirable to minimize the number of exception bypasses in the representation since these represent normal edges in the network graph and thus complicate the network topology seen by nodes. However, it is also important to ensure that the optimal paths of the resulting representation have the same cost as the optimal paths of the original peer group, ie. that the resulting representation accurately reflects the transition matrix.

Copending U.S. patent application Ser. No. 09/385,951, filed 30 Aug. 1999 and assigned to the Assignee of the present application, discloses one method for generating optimal complex node representations. This method is also discussed in "Optimal PNNI Complex Node Representations for Restrictive Costs and Reduced Path Computation Time", I. Iliadis, 7th IFIP Workshop on Performance Modelling and Evaluation of ATM Networks, 28 Jun. 1999. The representations are optimal in the sense that they use the minimum number of exception bypasses within the class of complex node representations for which the path computation time is minimal. More specifically, the path computation time was explicitly restricted by considering the class of complex node representations which have the property that a restricted set of paths in the representation, specified a priori, always contains an optimal path. The higher the restriction imposed, the smaller the resulting set specified and thus the shorter the path computation time required (since fewer paths have to be considered). The particular restriction imposed in this case will be explained in more detail below. The method employed is based on the evolution process of a so-called "logical group representation" of the transition matrix. According to this process, the values of the restrictive costs in the transition matrix are considered in order. For each cost value C, logical groups of the border nodes are defined such that, for any arrangement of the border nodes in a given logical group, the overall restrictive cost of a set of paths which connects all the nodes in the group along a line is equal to C. When the last cost value is considered, the logical group representation is obtained in which groups for preceding cost values are nested. This will be discussed in more detail below.

Embodiments of the present invention provide methods for generating complex node representations which are similarly based on the evolution process of the logical group representation, but in which the class of complex node representations is not constrained as in U.S. Ser. No. 09/385,951. Moreover, use is made of the so-called "spanning tree" representation of a network. The principles of spanning tree representations are described in "Spanning Tree Method for Link State Aggregation in Large Communications Networks", W. Lee, Proc. IEEE INFOCOM '95, Boston, vol. 1, pp. 297–302, April '95, though this document is not concerned with the problem of generating complex node representations.

SUMMARY OF THE INVENTION

According to a first aspect of the present invention there is provided a method of generating a complex node representation of a peer group of nodes in a PNNI network system, wherein the peer group includes a plurality of border nodes, and a set of restrictive costs, defining the restrictive costs of respective paths between pairs of the border nodes, is stored in said system, the complex node representation being a representation of the peer group in which at least some of the border nodes are connected to a nucleus by respective spokes and a connection between a pair of the border nodes is represented by an exception bypass, the method comprising:

(a) for each cost value C of the restrictive costs in said set, defining one or more groups of said border nodes such that, for any arrangement of the border nodes in a said group, the restrictive cost of a set of said paths which connects all the nodes in the group along a line is equal to C;

(b) selecting said groups in order of cost value C;

(c) for each group selected in step (b), generating a complex node representation of the group by:

(c1) selecting a subset of the nodes within the group, said subset comprising either a said group for a preceding cost value C in said order which is not contained within another said group for a preceding cost value in said order, or a single node, in dependence on the contents of the currently-selected group;

(c2) for each of any said groups for a preceding cost value, which are not contained within another said group for a preceding cost value, among the remaining nodes outside the subset in the currently-selected group, defining a spoke of cost C for at least one node and defining a spoke of cost $V \geq C$ for each other node, and for each of any single nodes, not forming part of a said group for a preceding cost value, among the remaining nodes outside the subset in the currently-selected group, defining a spoke of cost C, (c3) for each of any said groups for a preceding cost value, which are not contained within another said group for a preceding cost value, among the remaining nodes outside the subset in the currently-selected group, defining one or more exception bypasses connecting the nodes in the group to form a spanning tree, each exception bypass having a cost equal to the restrictive cost of the path between the pair of border nodes connected thereby; and (c4) incorporating the complex node representation of said subset of nodes, wherein, if said subset comprises a single node, the complex node representation of said subset comprises a spoke of cost $W \leq C$; and (d) storing the complex node representation for the last group selected in step (b) as the complex node representation for the peer group.

Embodiments of the invention provide highly efficient methods for generating complex node representations of PNNI peer groups. There is no constraint on the location of optimal paths within the resulting representations, and this, coupled with the spanning tree arrangement of exception bypasses in step (c3), enables generation of complex node representations with the minimum possible number of exception bypasses.

The network system may be a single network or part thereof, or an internetwork, and the set of restrictive costs may be presented in the usual way in the form of a transition matrix. In some embodiments of the invention, the method may include generating the set of restrictive costs for the peer group prior to performing step (a).

As will be apparent from the detailed description below, the number of groups defined for each cost value in step (a) will depend on the particular set, or matrix, of costs for the peer group in question. Steps (c2) to (c4) may be performed in any order, and the cost V of spokes defined in step (c2) may be different for different spokes. If, at step (c3), there are no groups for a preceding cost value outside the subset in the currently-selected group, then clearly no exception bypasses will be defined here. Also, if such a group for a preceding cost value contains only one pair of nodes, then clearly only a single exception bypass will be defined for that group. Further, while in general a spanning tree connection can be used in step (c3), particular embodiments may use a spanning line connection here, a spanning line being a special degenerate case of a spanning tree as discussed further below.

Where, in step (a), said groups are defined in order of cost value C, then steps (b) and (c) may be performed in parallel with step (a). For example, steps (b) and (c) for the groups defined for a particular cost value might be performed immediately after those groups have been defined in step (a). Where the cost of a link is defined in accordance with the convention that the lower the cost, the better the link, then a lower restrictive cost will represent a better path. In this case, groups will be selected in step (b) in order of increasing cost value C. However, embodiments can be envisaged where costs are defined differently ie. the higher the cost the better the link. For example, the "cost" could be directly proportional to the parameter, such as bandwidth, by which a link is measured, or the cost might be that parameter itself. If the costs were defined in such a way, the restrictive cost of a path would be the minimum of the costs of the constituent links and a higher restrictive cost would represent a better path. In such cases, groups would be selected in step (b) in order of decreasing cost value C.

After generation of the complex node representation for the peer group, topology data in which this representation is defined can be distributed in the network system in the usual way as described above. Path selection in network nodes can then be performed using this topology data in known manner. Thus, according to a second aspect of the invention there is provided a method of distributing topology data in a PNNI network system, the system including a peer group of nodes, including a plurality of border nodes, for which a set of restrictive costs, defining the restrictive costs of respective paths between pairs of the border nodes, is stored in the system, the method comprising:

generating a complex node representation of the peer group by a method according to the first aspect of the invention; and transmitting topology data, indicative of the complex node representation generated for the peer group, to at least one node of the network system outside the peer group.

In addition, according to a third aspect of the invention there is provided a method of selecting a path for routing a call in a PNNI network system, the system including a peer group of nodes, including a plurality of border nodes, for which a set of restrictive costs, defining the restrictive costs of respective paths between pairs of the border nodes, is stored in the system, the method comprising:

generating a complex node representation of the peer group by a method according to the first aspect of the invention;

transmitting topology data, indicative of the complex node representation generated for the peer group, to at least one node of the network system outside the peer group; and at said node of the network system outside the peer group, selecting a path for routing of a call between a sending node of the system and a receiving node of the system, which receiving node is reachable from the sending node via said peer group, in dependence on the complex node representation.

In general, where features are described herein with reference to a method of the invention, corresponding features may be provided in accordance with apparatus of the invention, and vice versa. Thus, according to a fourth aspect of the invention there is provided apparatus for generating a complex node representation of a peer group of nodes, including a plurality of border nodes, in a PNNI network system, the complex node representation being a representation of the peer group in which at least some of the border nodes are connected to a nucleus by respective spokes and a connection between a pair of the border nodes is represented by an exception bypass, the apparatus comprising memory for storing a set of restrictive costs, defining the restrictive costs of respective paths between pairs of the border nodes, and control logic configured to:

(a) for each cost value C of the restrictive costs in said set, define one or more groups of said border nodes such that, for any arrangement of the border nodes in a said group, the restrictive cost of a set of said paths which connects all the nodes in the group along a line is equal to C;

(b) select said groups in order of cost value C;

(c) for each group selected in step (b), generate a complex node representation of the group by:

(c1) selecting a subset of the nodes within the group, said subset comprising either a said group for a preceding cost value C in said order which is not contained within another said group for a preceding cost value in said order, or a single node, in dependence on the contents of the currently-selected group;

(c2) for each of any said groups for a preceding cost value, which are not contained within another said group for a preceding cost value, among the remaining nodes outside the subset in the currently-selected group, defining a spoke of cost C for at least one node and defining a spoke of cost $V \geq C$ for each other node, and for each of any single nodes, not forming part of a said group for a preceding cost value, among the remaining nodes outside the subset in the currently-selected group, defining a spoke of cost C;

(c3) for each of any said groups for a preceding cost value, which are not contained within another said group for a preceding cost value, among the remaining nodes outside the subset in the currently-selected group, defining one or more exception bypasses connecting the nodes in the group to form a spanning tree, each exception bypass having a cost equal to the restrictive cost of the path between the pair of border nodes connected thereby, and (c4) incorporating the complex node representation of said subset of nodes, wherein, if said subset comprises a single node, the complex node representation of said subset comprises a spoke of cost $W \leq C$; and (d) to store in said memory the complex node representation for the last group selected in step (b) as the complex node representation for the peer group.

Further aspects of the invention provide: a device for connection in a PNNI network system as a node of a PNNI peer group, which device comprises apparatus according to the fourth aspect of the invention; and a PNNI network system including one or more such devices. Another aspect of the invention provides a computer program product, readable by a processor of a device for connection in a PNNI network system as a node in a peer group of nodes, including a plurality of border nodes, for which a set of restrictive costs, defining the restrictive costs of respective paths between pairs of the border nodes, is stored in the system, said product comprising computer program code means executable by the processor to generate a complex node representation of said peer group by performing a method according to the first aspect of the invention.

BRIEF DESCRIPTION OF THE DRAWINGS

Preferred embodiments of the invention will now be described, by way of illustrative and non-limiting example, with reference to the accompanying drawings in which:

FIG. 9 illustrates the logical group representation for a sample transition matrix;

FIGS. 10a through 10e illustrate successive stages in the complex node generation process; and FIG. 11 illustrates schematically how the resulting complex node representation can be used in a network system embodying the invention.

DESCRIPTION OF PREFERRED EMBODIMENTS

Figure 1:
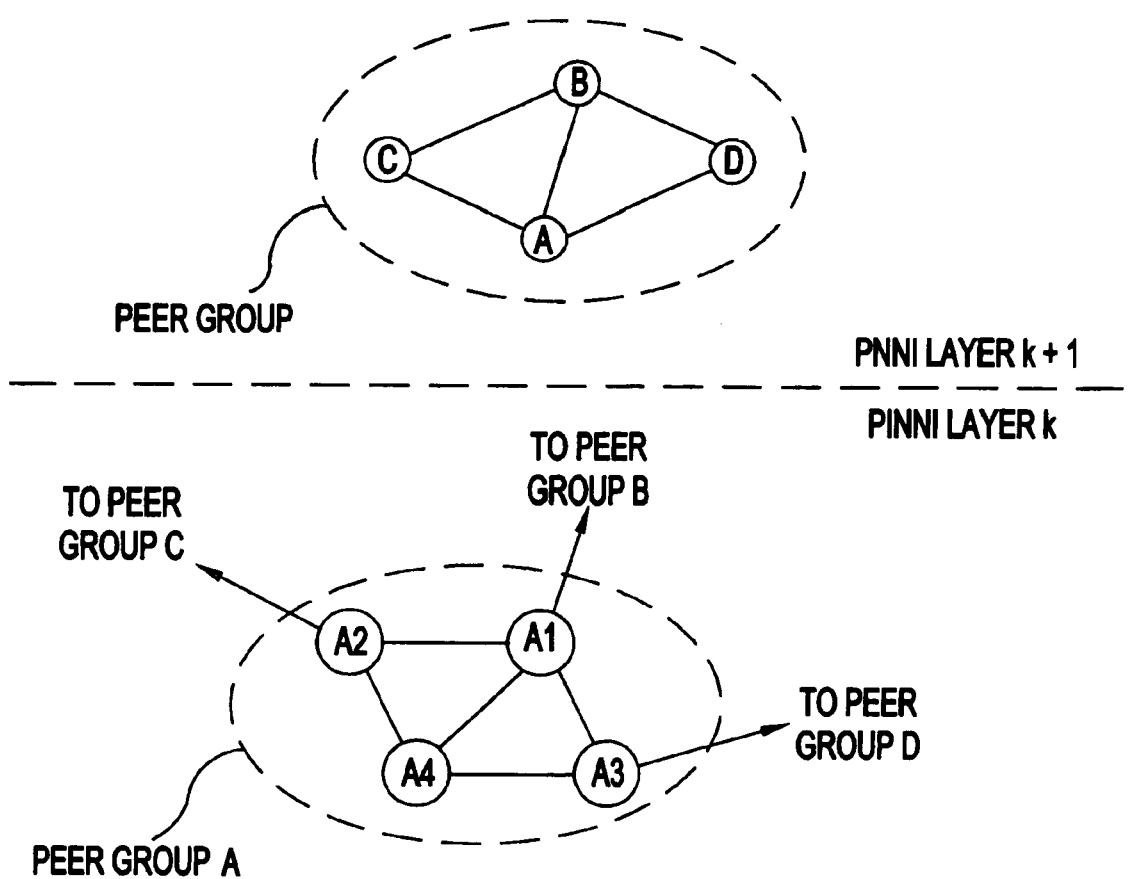
FIG. 1 illustrates the process of topology abstraction in a PNNI network.
Figure 2:
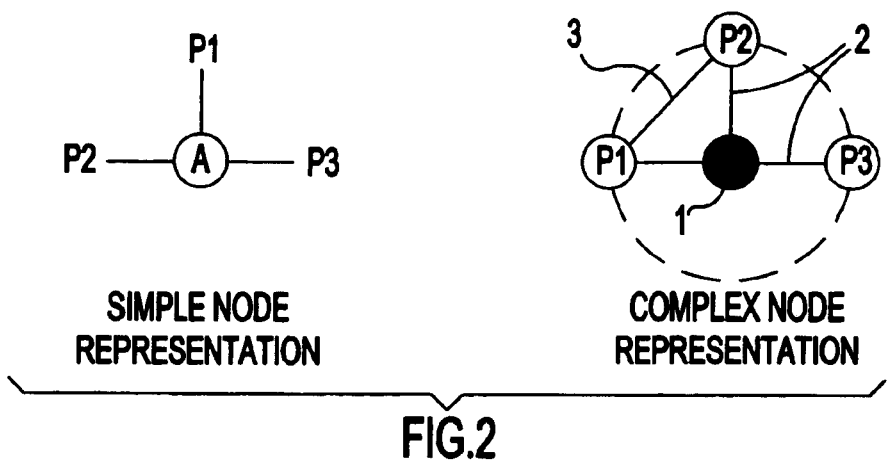
FIG. 2 illustrates two different representations of a logical group node in a PNNI network.

Before discussing the complex node generation process, it is useful first to consider some underlying principles.

As mentioned earlier, a network can be modeled by an oriented graph in which:
- a node of the network is referenced as a vertex of the graph; and
- a link between nodes is referenced as an edge between two vertices of the graph.

Let $G(V, E)$ be the graph representing the network at a given point in time. Here, V is the set of vertices and E the set of directed, or directional, edges. Thus, for all $v_i, v_j \in V$, if $v_i$ and $v_j$ are connected, the edge $$v_i \xrightarrow{\varepsilon_{v_i,v_j}} v_j \in E.$$

Let $v_x$ and $v_y$ be two vertices of the graph $G(V, E)$. The path $$v_x \xrightarrow{P_{x,y}} v_y$$

is a sequence of n vertices such that:

$$P_0 = v_x$$
$$P_{n-1} = v_y$$
$$\exists \varepsilon_{P_i,P_{i+1}} \in E \forall i \in [0, \ldots, n-2]$$

The length of a path is the number of edges in the path. If the path does not exist, $P_{x,y} = \emptyset$. In this case the path is said not to be feasible.

Let us now associate a cost with an edge. For an edge $\varepsilon_{v_i,v_j} \in E$, such a cost will be $C(\varepsilon_{v_i,v_j}) \in \mathbb{N}$. (To be more general one could consider $C(\varepsilon_{v_i,v_j}) \in \mathbb{R}^+$, but, since the PNNI protocol only allows integer representations, in the following only integer values will be considered. It is to be noted, however, that the present invention can be applied to non-integer costs). The restrictive cost of a path is the maximum of the costs of the traversed edges. Thus, for a feasible path $P_{x,y}$ from $v_x$ to $v_y$ of length n, the restrictive cost will be:

$$C_r(P_{x,y}) = \max_{i=0 \text{ to } n-2} \{C(\varepsilon_{P_i,P_{i+1}})\}$$

If the path is not feasible then $C_r(P_{x,y}) = \infty$. It is possible to define the cost of an edge in both directions: $C^f(P_{v_i,v_j}) = C(\varepsilon_{v_i,v_j})$, and $C^r(P_{v_i,v_j}) = C(\varepsilon_{v_j,v_i})$. At path level:

$$C_r^f(P_{x,y}) = \max_{i=0 \text{ to } n-2} \{C(\varepsilon_{P_i,P_{i+1}})\}, \text{ and}$$

$$C_r^r(P_{x,y}) = \max_{i=0 \text{ to } n-2} \{C(\varepsilon_{P_{i+1},P_i})\}.$$

When computing optimal paths, it is sometimes sufficient to minimize a "symmetric" cost. That is, only one cost is associated with a path regardless of direction. In the case of directed edges, this requires a symmetrization step. For all edges $\varepsilon_{v_i,v_j}$ of the graph a symmetric restrictive cost is defined:

$$C_r^s(\varepsilon_{v_i,v_j}) = C_r^s(\varepsilon_{v_j,v_i}) = \max\{C(\varepsilon_{v_i,v_j}), C(\varepsilon_{v_j,v_i})\}.$$

The extension to path level is straightforward:

$$C_r^s(P_{x,y}) = \max\{C_r^s(\varepsilon_{P_i,P_{i+1}})\}.$$

The transition matrix for a PNNI peer group can be derived in various ways based on the above principles by modeling the peer group as an oriented graph. One example of a method for deriving the transition matrix is described in copending U.S. patent application Ser. No. 09/364,443, filed 30 Jul. 1999 and assigned to the Assignee of the present application, and "Transition Matrix Generation for Complex Node Representations", I. Iliadis & P. Scotton, IEEE ATM Workshop, Kochi City, Japan, May 27, 1999. The resulting transition matrix defines the restrictive costs of the optimal (lowest-cost) paths between all pairs of border nodes in the peer group. Thus, for a peer group containing N border nodes $n_1$ to $n_N$, with the restrictive cost of a path between two border nodes $n_i$ and $n_j$ being $c_{i,j}$, the transition matrix $M_N(C)$ is given by:

$$M_N(C) = \begin{bmatrix} 0 & c_{1,2} & \cdots & \vdots & c_{1,N} \\ c_{2,1} & 0 & \cdots & \vdots & \vdots \\ \vdots & \vdots & \cdots & 0 & c_{N-1,N} \\ c_{N,1} & \vdots & \cdots & c_{N,N-1} & 0 \end{bmatrix}$$

Because of the cost symmetry this matrix is symmetric.

Figure 3:
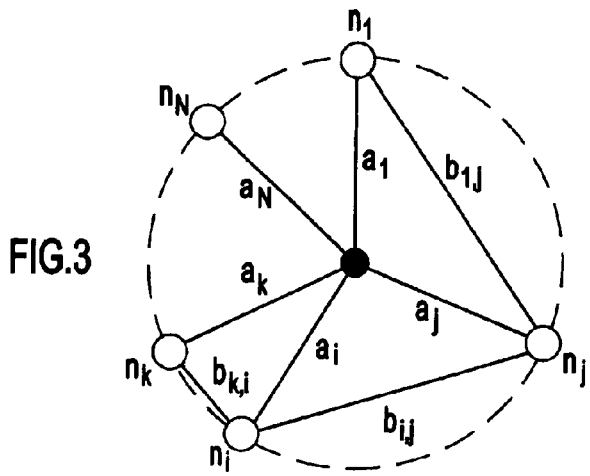
FIG. 3 is a more detailed illustration of a complex node representation.

As described earlier, the object of the complex node representation in general is to map the peer group to a representation which accurately reflects the transition matrix. Let $R(M_N(C))$ be a complex node representation corresponding to the transition matrix $M_N(C)$. Referring to the complex node representation of FIG. 3, $a_k$ denotes the cost of the spoke associated with the node $n_k$, and $b_{i,j}$ the cost of the exception bypass associated with the pair of nodes $n_i$, $n_j$. When computing a path, in order to find the cost $c_{i,j}$ of the optimal path between nodes $n_i$ and $n_j$, then a search of all possible paths connecting nodes $n_i$ and $n_j$ should be conducted. This follows from the general principle that the cost of the optimal (lowest-cost) path between any two vertices $v_x$ and $v_y$ is given by:

$$C_r^{opt}(v_x, v_y) = \min_{P_{x,y} \in S_{x,y}} \{C_r(P_{x,y})\} \quad (1)$$

where: $S_{x,y} = \{P_{x,y}\}$ denotes the set of paths connecting $v_x$ and $v_y$; and $C_r(P_{x,y})$ denotes the restrictive cost of the path $P_{x,y}$. In U.S. Ser. No. 09/385,951 mentioned earlier, in order to reduce path computation time, only the class of complex node representations for which it holds that the optimal path can be either the direct exception bypass (if it exists), or the path through the nucleus, is considered, ie:

$$c_{i,j} = \begin{cases} \min(b_{i,j}, \max(a_i, a_j)) & \text{if } \exists\, b_{i,j} \\ \max(a_i, a_j) & \text{otherwise} \end{cases}, \forall\, i, j (1 \le i \ne j \le N).$$

In the embodiment described below, however, the class of complex node representations is not constrained, and $c_{i,j}$ is the minimum of all possible paths connecting nodes $n_i$ and $n_j$ in accordance with equation (1) above, ie:

$$c_{i,j} \le \begin{cases} \min(b_{i,j}, \max(a_i, a_j)) & \text{if } \exists\, b_{i,j} \\ \max(a_i, a_j) & \text{otherwise} \end{cases}, \forall\, i, j (1 \le i \ne j \le N).$$

Let B(R) denote the number of exception bypasses used by the complex node representation R. Note that there can be several complex node representations corresponding to a given transition matrix. One complex node representation, for example, could be the following:

$$R_{max}: a_i = \infty\, \forall i (1 \le i \le N) \text{ and } b_{i,j} = c_{i,j} \forall i,j (1 \le i \ne j \le N).$$

This representation uses exception bypasses for all pairs of nodes. Consequently, the number of exception bypasses is the maximum possible and is equal to $B(R_{max}) = N(N-1)/2$. The drawback of this approach is the increased path selection algorithm complexity due to the number of exception bypasses. Another possible complex node representation with a smaller number of exception bypasses could be obtained by making use of a spanning line representation. (As noted earlier, a spanning line is a special degenerate case of a spanning tree. The principles of spanning tree representations in general are described in the paper by W. Lee referenced above. Spanning lines will be described further below). In this case, exception bypasses are used to connect only neighboring nodes on the line:

$$R_{s-line}: a_i = \infty\, \forall i (1 \le i \le N) \text{ and } b_{j_k, j_{k+1}} = c_{j_k, j_{k+1}} \forall k (1 \le k \le N-1).$$

Consequently, the number of exception bypasses is equal to $B(R_{s-line}) = N-1$. As demonstrated below, embodiments of the present invention provide complex node representations with a reduced number of exception bypasses.

The structure of optimal complex node representations is tightly coupled to the evolution process of the logical group representation of the transition matrix as discussed in U.S. Ser. No. 09/385,951. This process will now be described with reference to FIGS. 4a through 4c. Let $C_{min}(C_{max})$ be the minimum(maximum) values of the restrictive costs in the transition matrix $M_N(C)$ (where the diagonal matrix elements of value zero are excluded). Formally:

$$C_{min} = \min_{\forall i,j}\{c_{i,j}\},\ C_{max} = \max_{\forall i,j}\{c_{i,j}\}.$$

Let F be the number of different cost values C of cost entries in $M_N(C)$ sorted in order of increasing cost value:

$$C_{min} = C_1 < C_2 < \ldots < C_k < \ldots < C_F = C_{max}.$$

Figure 4A:
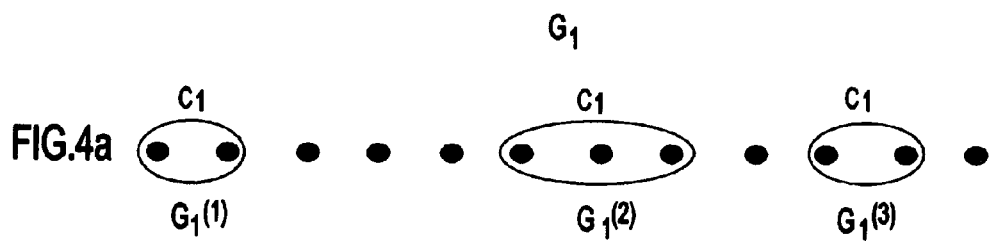
FIGS. 4a through 4c illustrate the group evolution process for the logical group representation corresponding to the transition matrix for a PNNI peer group.
Figure 4B:
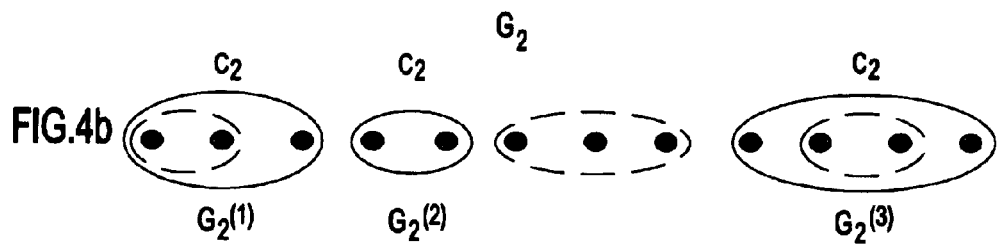
Figure 4C:
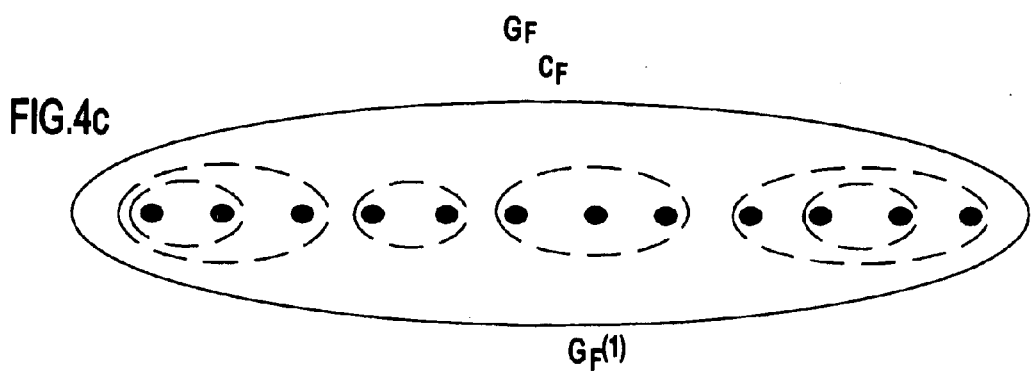

Consider first the set of node pairs $(n_i, n_j)$ for which the associated cost is equal to $C_1$. These nodes can be organized into logical groups as indicated in FIG. 4a such that the cost of paths between any pair of nodes in any of these logical groups is equal to $C_1$. Let $G_1$ be the set of these groups denoted by $G_1^{(1)}, \ldots, G_1^{(g1)}$. FIG. 4a depicts three such groups (g1=3), groups $G_1^{(1)}$ and $G_1^{(3)}$ containing two nodes and group $G_1^{(2)}$ containing three nodes. In the case of restrictive costs, it turns out that the cost between any node belonging to a particular logical group and another node outside that group is the same, ie. all nodes in one group have the same "Property". It is important to note that the cost between any node belonging to the set $G_1$ and another node outside $G_1$ is at least equal to $C_2$. This allows us to merge all the nodes of a logical group into one entity and, subsequently, apply the same procedure again for cost value $C_2$ as shown in FIG. 4b. Here, the cost between any node in set $G_2$ and a node outside $G_2$ is at least $C_3$. Applying this procedure successively k times gives the set $G_k$ of logical groups $G_k^{(1)}, \ldots, G_k^{(gk)}$ for cost value $C_k$. Finally, after applying the procedure for the maximum cost value $C_F$, the logical group $G_F^{(1)}$ containing all the nodes is obtained as shown in FIG. 4c. This final logical group is the logical group representation of the peer group and contains all the logical groups $G_1^{(1)}, \ldots, G_1^{(g1)}, G_2^{(1)}, \ldots, G_2^{(g2)}, \ldots G_k^{(1)}, \ldots, G_k^{(gk)}, \ldots, G_F^{(1)}$ for which the aforementioned Property holds. It will be seen that the logical grouping of nodes in this process is such that, for any possible arrangement of the nodes in a given group for a given cost value C, the restrictive cost of a set of paths (the paths being represented by entries in the transition matrix), which set of paths connects all the nodes in the group along a line, is equal to C. It is to be noted, however, that while the above describes a derivation of the logical group representation considering the cost values sorted in increasing order, the same result can be obtained by considering the cost values in decreasing order, or indeed any order.

Figure 5:
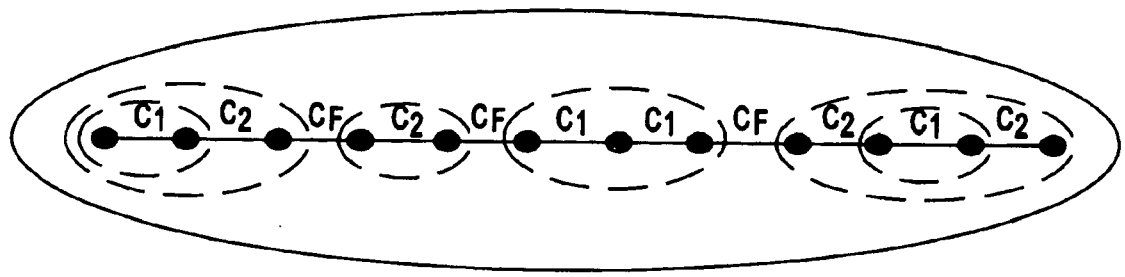
FIG. 5 illustrates the spanning line corresponding to the group evolution process of FIGS. 4a through 4c.

In accordance with the principles of spanning tree representations, for a network of N border nodes, any representation connecting all N nodes uses at least N−1 links, and an accurate representation can be obtained using a spanning tree consisting of N−1 links. This representation is clearly optimal because it uses the minimum possible number of links. A spanning line as proposed herein is a special degenerate case of a spanning tree. A spanning line can be applied to the group evolution process discussed above to obtain an optimal representation, and will now be explained with reference to FIGS. 4a through 4c. Consider first the set $G_1$ consisting of groups $G_1^{(1)}, \ldots, G_1^{(g1)}$. The nodes contained in a typical such group $G_1^{(m)}(1 \le m \le g1)$ are ordered, in any sequence, and connected serially by links of cost $C_1$. This formation constitutes a line connecting the intermediate nodes to the two extreme nodes selected. Next we consider the set $G_2$ consisting of groups $G_2^{(1)}, \ldots, G_2^{(g2)}$. The nodes contained in a typical such group $G_2^{(m)}$ ($1 \le m \le g2$) are ordered in any sequence and connected serially by links of cost $C_2$. Nodes belonging to a $G_1^{(j)}$ group are considered as a single entity and are connected to their neighboring nodes through the two extreme nodes. This formation constitutes a spanning line connecting the nodes considered. This procedure is applied repeatedly until all nodes are connected. The spanning line corresponding to the group evolution process of FIGS. 4a through 4c is shown in FIG. 5.

The algorithm implemented by embodiments of the present invention will now be described. Let $S_R$ be the set of all possible complex node representations R associated with the cost matrix $M_N(C)$. The aim is to find the set of complex node representations $R_{min}$ that use the minimum possible number of exception bypasses, as well as to determine this number denoted by $B_{min}$. Thus:

$$B_{min}(G) = \min_{R \in S_R}\{B(R)\} \text{ and } B(R_{min}) = B_{min}$$

It will be apparent from the foregoing that:

$$0 \leq B_{min} \leq B(R_{s\text{-}line}) = N-1 \leq B(R_{max}) = N(N-1)/2$$

Figure 6:
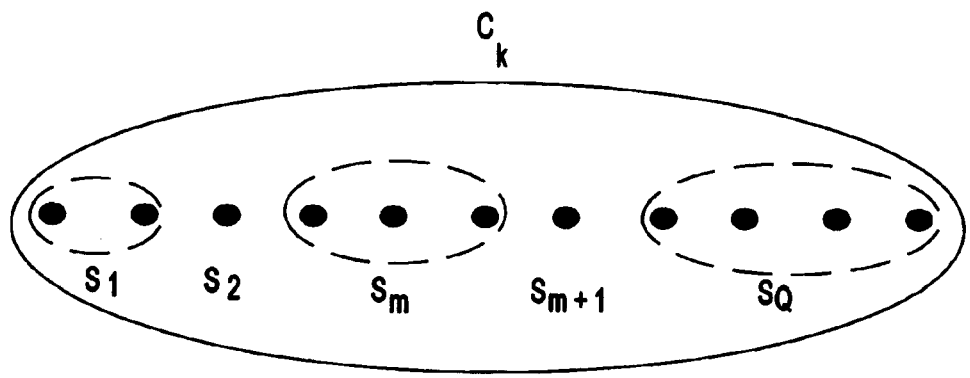
FIG. 6 illustrates one group in a logical group representation evolution process to which reference will be made in explaining a complex node generation process embodying the invention.

Referring to the group evolution process described above, consider the $k^{th}$ iteration of the process in which groups for cost value $C_k$ are formed. Let us focus on one typical group G belonging to the set $G_k$ and assume that it contains groups $S_1, \ldots, S_m, \ldots, S_Q$ as shown in FIG. 6. It turns out that, in order to obtain the optimal complex node representation of G, knowledge of the optimal complex node representations of the groups $S_1, \ldots, S_m, \ldots, S_Q$ is required.

The following definitions are introduced:

$R_{min}(G)$: an optimal complex node representation corresponding to the nodes contained in G;

$B_{min}(G)$: the number of exception bypasses used in $R_{min}(G)$;

$|S_m|$: the number of nodes contained in $S_m$;

$R_{min}(S_m)$: an optimal complex node representation corresponding to the nodes contained in $S_m$;

$B_{min}(S_m)$: the number of exception bypasses used in $R_{min}(S_m)$.

To obtain the set of complex node representations $R_{min}(G)$, the quantities $R_{min}(S_m)$ and $B_{min}(S_m)$ should be known. The steps of the algorithm are as follows:

1. The minimum number of exception bypasses corresponding to the optimal set of complex node representations is given by:

$$B_{min}(G) = \min_{1 \leq j \leq Q}\left\{B_{min}(S_j) + \sum_{\substack{i=1 \\ i \neq j}}^{Q}(|S_i| - 1)\right\}$$

2. Let $S_m$ be the group (there exists at least one such group) that satisfies the following relation:

$$B_{min}(S_m) + \sum_{\substack{i=1 \\ i \neq m}}^{Q}(|S_i| - 1) = B_{min}(G)$$

3. Set the cost of the spokes corresponding to the nodes contained in the remaining Q-1 groups $S_1, \ldots, S_{m-1}, S_{m+1}, \ldots, S_Q$ such that, in each one of these groups, there is at least one node for which the cost of its spoke is equal to $C_k$, whereas the cost of the spokes of the other nodes of the group is at least $C_k$.

4. For each of the Q-1 groups, connect the nodes in the group by exception bypasses so as to form a spanning tree (which may be a spanning line).

5. Transfer the optimal complex node representation of the group $S_m$, comprising spokes and bypasses, into the corresponding component of $R_{min}(G)$.

Thus, for every cost value C of the restrictive costs in the transition matrix, the groups G are defined as described earlier. The groups are then selected in order of increasing cost value, and the complex node representation for each group is generated by applying the above algorithm. Thus for a typical cost $C_k$, the groups $G_k^{(1)}, \ldots, G_k^{(gk)}$ are identified and the corresponding set of complex node representations is obtained in accordance with the algorithm. At the final step, corresponding to the last group that contains all the nodes, the set of optimal complex node representations sought is obtained. As each group G is selected and the algorithm applied, it will be seen that steps 1 and 2 of the algorithm involve selecting a subset (represented in the algorithm by group $S_m$) of nodes in the group G. This subset $S_m$ will be either: (a) a group for a preceding cost value C in the order of selection which is not contained within another group for a preceding cost value in the order; or (b) a single node which is not contained within another group for a preceding cost value in the order. Whether the subset $S_m$ is a group of nodes or a single node will depend on the contents of the group G. Either way, the subset $S_m$ is selected to give the minimum number of exception bypasses in the complex node representation for G according to the formula in step 1 of the algorithm. After the subset $S_m$ has been selected, step 3 of the algorithm defines the cost of spokes for the remaining nodes, outside the subset $S_m$, in the group G. These remaining nodes correspond to nodes in groups $S_1, \ldots, S_{m-1}, S_{m+1}, \ldots, S_Q$. Again, each of these groups is either (a) a group for a preceding cost value C in the order of selection which is not contained within another group for a preceding cost value in the order; or (b) a single node which is not contained within another group for a preceding cost value in the order. In step 4 of the algorithm, for each of any groups for a preceding cost value (which are not contained within another group for a preceding cost value) among these remaining nodes, the nodes in the group are connected by exception bypasses to form a spanning tree or spanning line. The cost of a given exception bypass will be the corresponding entry in the transition matrix, ie. the restrictive cost of the path between the pair of nodes connected by the exception bypass. In step 5, the optimal complex node representation of the subset $S_m$ is incorporated. This will generally have been derived by an earlier pass of the algorithm for a preceding cost value. However, if the subset $S_m$ consists of a single node (as will be the case, for example, for a group G corresponding to the minimum cost value C), then the complex node representation incorporated here will simply be a spoke of cost $W \leq C$ where C is the cost value for group G. A specific example of the complex node representation generation process for a peer group will be described later.

Figure 7:
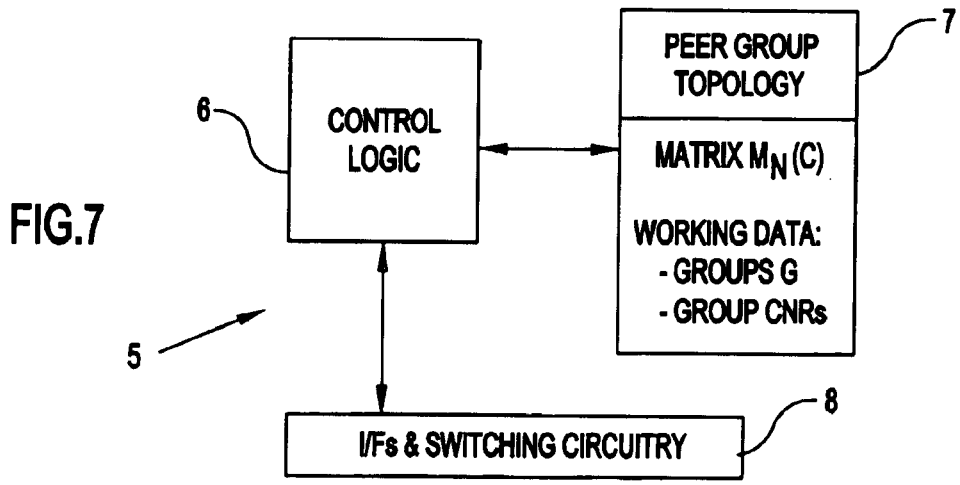
FIG. 7 is a schematic illustration of a network device for implementing methods embodying the invention.

The complex node representation for a peer group may be generated by one, or more than one, of the nodes in the peer group. For example, the complex node representation may be generated by the peer group leader, or each border node, or all nodes in the peer group. The complex node representation may be generated, for example, on initial setup of the network or peer group, or following changes to the peer group topology. FIG. 7 is a block diagram illustrating a network device for implementing the process. In general such a device may be a switch, router, bridge, brouter or other network device, though only the main elements of the device are shown in this schematic representation. As illustrated, the device 5 comprises a control unit 6, a memory 7 and circuitry 8 which represents the interfaces (I/Fs) and switching fabric which connect the device with its links to neighboring nodes and via which the device communicates with the rest of the network. The control unit 6 controls operation of the device generally, and includes control logic which is configured to implement the complex node representation generation process. The control logic may be implemented in hardware or software, or a combination thereof, and suitable implementations will be apparent to those skilled in the art from the description herein. In particular, the control unit 6 may be implemented by a suitably programmed processor, and the memory 7 may be an internal memory of the processor or an external memory associated with the processor. Where the complex node generation logic is implemented in software, the program code may be supplied separately (as an independent element or an element of the code for a number of control functions) for loading in a processor to configure the processor to operate as described.

As indicated schematically in the figure, the memory 7 is used for storage of various data used by the complex node generation process embodying the invention. In the present case, this data includes a peer group topology database in which details of the peer group of which the device is a member are maintained in known manner. This topology data includes details of the nodes and links and the costs associated with the links. The additional data indicated in the figure consists of the transition matrix $M_N(C)$ for which entries are generated in operation from the topology data; and various working data which comprises data defining the logical groups G, and the complex node representations (CNRs) derived for these groups.

Figure 8:
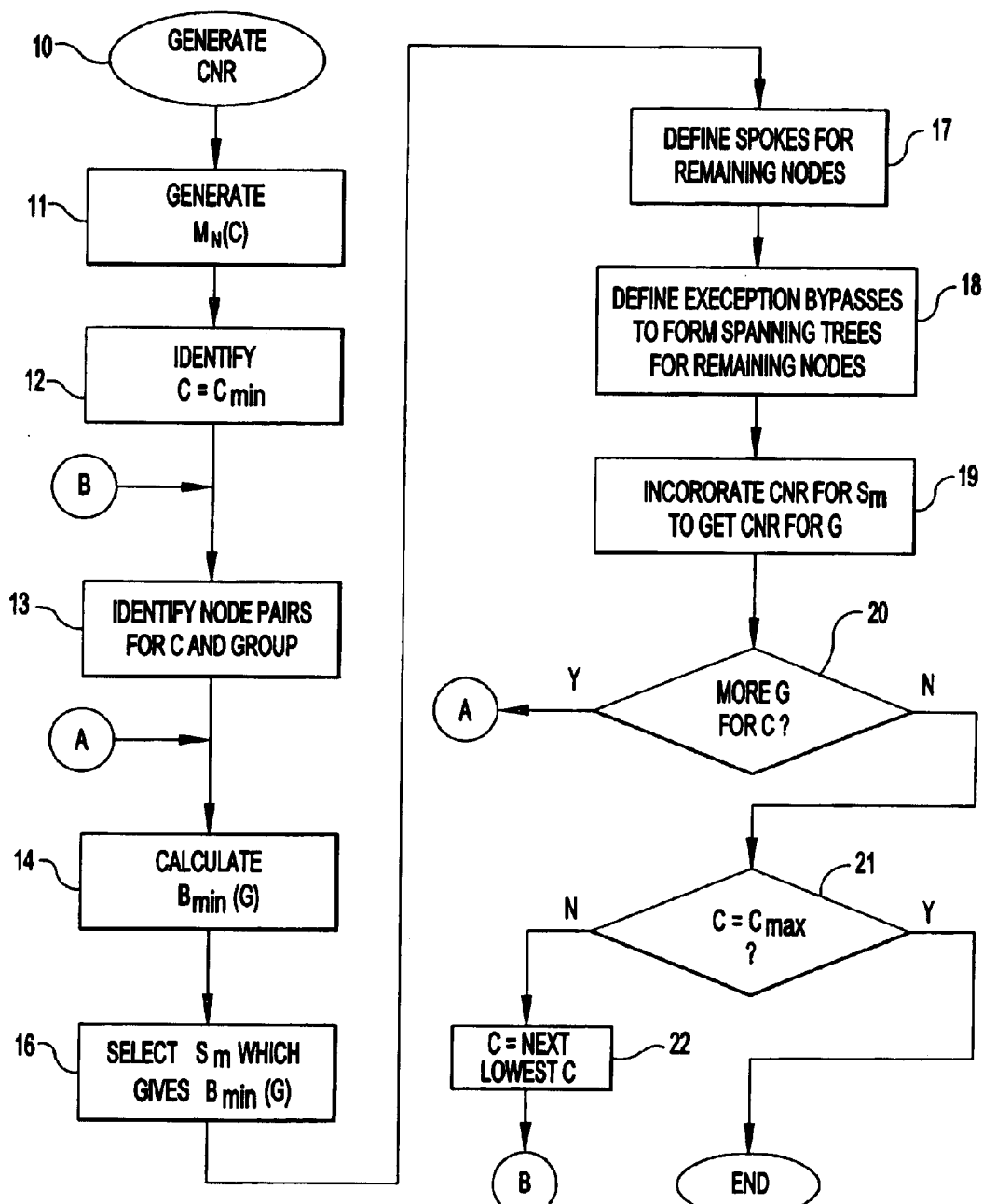
FIG. 8 is a flow chart illustrating the complex node generation process.

The flow chart of FIG. 8 provides an example of the process implemented by the network device 5 and includes steps corresponding generally to the algorithm described in detail above. Operation begins when the complex node representation for the peer group is to be generated as indicated at step 10 in the figure. In step 11, the control logic 6 in this embodiment generates the transition matrix $M_N(C)$ for the peer group and stores $M_N(C)$ in memory 7. The matrix $M_N(C)$ is generated in known manner from the topology data stored in the topology database of memory 7. Next, in step 12, the control logic identifies the minimum cost value $C=C_{min}$ from the entries in $M_N(C)$. In step 13, the control logic identifies from $M_N(C)$ all node pairs for which the restrictive cost is equal to the current value of C, here $C_{min}$, and defines one or more groups G for this cost value according to the process described above. Data defining these groups is then stored in memory 7. In step 14, one of the groups G for the current cost value is selected, and in step 15 $B_{min}(G)$ for this group is calculated in accordance with step (1) of the above algorithm. Next, in step 16, the subset (group $S_m$) which gives $B_{min}(G)$ according to step (2) of the algorithm is selected. In step 17, the cost of spokes for the remaining nodes outside $S_m$ in group G are defined in accordance with step (3) of the algorithm. In step 18, exception bypasses are defined for groups among the remaining nodes outside $S_m$ in group G to form spanning trees in accordance with step (4) of the algorithm. The results of steps 17 and 18 are stored in memory 7 as part of the CNR for group G. Next, in step 19, the CNR for the subset $S_m$ is incorporated with the results of steps 17 and 18 to give the CNR for group G in memory 7. Here, if $S_m$ is a single node (as will be the case for $C=C_{min}$), then the CNR for $S_m$ is a single spoke of cost $W \leq C$. If $S_m$ is a group nodes, as may be the case for $C > C_{min}$, then the CNR for $S_m$ will have been stored in memory 7 in a previous pass of the process.

Next, step 20 checks for any further groups G for the current cost value C. If there is a further group for this cost value, then operation reverts to step 14 where this next group is selected and steps 15 to 19 are repeated as above. If CNRs have been derived for all groups G for the current cost value C, then step 21 checks whether all cost values have been considered, ie. whether $C=C_{max}$. If not, in step 22, the next lowest cost value is selected as the new current value of C, and operation reverts to step 13. Here, the groups G are defined for the new value of C and the process continues as before. When, in step 21, $C=C_{max}$, then the process terminates and the CNR stored in memory 7 for the last group G is the complex node representation for the peer group. Note that, while all variations within the algorithm defined above represent the exact set of optimal complex node representations (ie. those with the minimum possible number of exception bypasses), in practice any one of these representations can be selected by the device by selecting a particular variation, for example by selecting particular values for each cost V and W defined above, and by selecting a particular implementation of step (3) of the algorithm within the criteria specified.

A particular example of the CNR generation process will now be illustrated for the following cost matrix $M_7(C)$:

$$M_7(C) = \begin{array}{c} \\ n_1 \\ n_2 \\ n_3 \\ n_4 \\ n_5 \\ n_6 \\ n_7 \end{array} \begin{array}{c} n_1 \; n_2 \; n_3 \; n_4 \; n_5 \; n_6 \; n_7 \\ \left[\begin{array}{ccccccc} 0 & 3 & 7 & 7 & 8 & 8 & 8 \\ 3 & 0 & 7 & 7 & 8 & 8 & 8 \\ 7 & 7 & 0 & 4 & 8 & 8 & 8 \\ 7 & 7 & 4 & 0 & 8 & 8 & 8 \\ 8 & 8 & 8 & 8 & 0 & 4 & 6 \\ 8 & 8 & 8 & 8 & 4 & 0 & 6 \\ 8 & 8 & 8 & 8 & 6 & 6 & 0 \end{array}\right] \end{array}$$

In this case, we have: $C_{min}=C_1=3$, $C_2=4$, $C_3=6$, $C_4=7$, $C_5=C_{max}=8$.

Figure 10C:
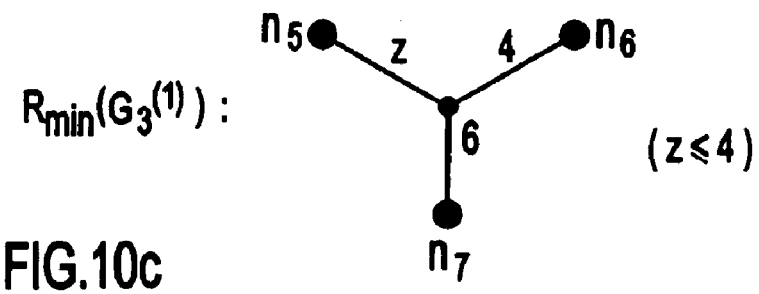
Figure 10D:
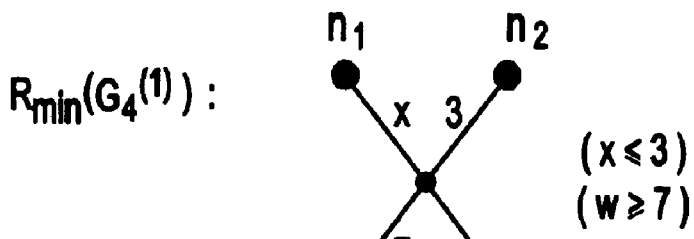

The group evolution process corresponding to this matrix is indicated schematically in FIG. 9. Successive stages in the complex node generation process are illustrated schematically in FIGS. 10a through 10e. FIG. 10a shows the CNR for group $G_1^{(1)}$, where node $n_1$ is taken as the subset $S_m$ here. FIG. 10b shows the CNRs for groups $G_2^{(1)}$ and $G_2^{(2)}$, where nodes $n_3$ and $n_5$ respectively are selected as $S_m$ in these cases. FIG. 10c shows the CNR for group $G_3^{(1)}$, where group $G_2^{(2)}$ is taken as the subset $S_m$. FIG. 10d shows the CNR for group $G_4^{(1)}$, where group $G_1^{(1)}$ is taken as $S_m$. FIG. 10e shows the CNR for group $G_5^{(1)}$, which corresponds to the peer group CNR, where group $G_4^{(1)}$ is taken as $S_m$.

It will be seen that the resulting CNR uses only three exception bypasses. Note that, in the form shown, FIG. 10e actually represents a set of optimal representations because the $n_1$ spoke can take any value up to 3, and the $n_3$, $n_5$ and $n_6$ spokes can similarly take a range of values. In practice, particular values would be selected for these as described above. FIG. 10e does not of course represent the entire set of optimal CNRs provided by the algorithm because particular choices have been made in this example with regard to the arrangement of exception bypasses and the selection of one of the possible subsets $S_m$ in some stages. For example, in FIG. 10d, $G_2^{(1)}$ could have been selected as $S_m$ and an exception bypass connected between nodes $n_1$ and $n_2$ instead, resulting in another set of optimal representations.

Peer group CNRs generated by embodiments of the invention may be used for various purposes as indicated for example by the schematic flow chart of FIG. 11. Once the transition matrix is obtained at step 30, the complex node representation for the peer group can be derived as indicated at step 31. Data defining the complex node representation can then be transmitted to neighboring nodes in the PNNI peer group in the next hierarchy level via the usual process for advertising topology data, as indicated by step 32. This data can then be used in known manner by network nodes for path selection and routing purposes as indicated by step 33, whereby the costs associated with traversing the peer group can be taken into account in these processes. For example, when selecting a path for routing a call between a sending node and a receiving node, if the receiving node can be reached by paths traversing different peer groups, the complex node representations for these peer groups will be used (eg. by the sending node) to identify the best path for routing the call across the network. Here, when computing a path using a complex node representation generated as above, the node will search all possible paths in the representation to determine the optimal path, since the location of the optimal path is not constrained as described above.

While particular embodiments of the invention have been described in detail above, it will be understood that many changes and variations can be made to these embodiments within the spirit and scope of the invention.

Having thus described the invention, what is claimed is:

1. A method of generating an optimal complex node representation of a peer group of nodes in a PNNI network system, wherein the peer group includes a plurality of border nodes, and a set of restrictive costs, defining the restrictive costs of respective paths between pairs of the border nodes, is stored in said system, the optimal complex node representation being a representation of the peer group in which at least some of the border nodes are connected to a nucleus by respective spokes and a connection between a pair of the border nodes is represented by an exception bypass, the method comprising:

(a) for each cost value C in said set of restrictive costs, defining one or more groups of said border nodes such that, for any arrangement of border nodes in said group, the restrictive cost of a plurality of paths to connect the nodes in the group along a line is equal to C;

(b) ordering said groups in order of said cost value C;

(c) selecting a first group and a plurality of additional groups group and generating a group complex node representation for each selected group by:

(c1) selecting a subset of the nodes within the selected group, said subset comprising either a single node or a subgroup which has not previously been defined as a subset for said first group or for one of said additional groups, whereby said selected group comprises said subset and at least one remaining node;

(c2) generating a subset complex node representation for said subset;

(c3) for each of said at least one remaining node, defining a spoke of cost C for one node and defining a spoke of cost $V \geq C$ for each other node greater than one;

(c4) for each of said at least one remaining node defining exception bypasses connecting any remaining nodes in the group to form a spanning tree, each exception bypass having a cost equal to the restrictive cost of the path between the pair of border nodes connected thereby;

(c5) incorporating the subset complex node representation of said subset of nodes with said spokes and exception bypasses to form a group complex node representation; and (d) storing the group complex node representation for the last group selected in step (b) as the optimal complex node representation for the peer group.

2. A method as claimed in claim 1 wherein, in step (b), said groups are selected in order of increasing cost value.

3. A method as claimed in claim 1 wherein, in step (c3), said exception bypasses are defined so as to connect said remaining nodes to form a spanning line.

4. A method as claimed in claim 1 wherein step (a) comprises, for each cost value C:

(a1) identifying all pairs of the border nodes for which said restrictive cost of the path between the pair of border nodes is C;

(a2) grouping the nodes of all pairs identified in step (a1) to define said one or more groups.

5. A method as claimed in claim 1 wherein, in step (a), said groups are defined in said order of cost value C, and wherein steps (b) and (c) are performed in parallel with step (a).

6. A method as claimed in claim 1 wherein, in step (c1), said subset is selected from:

any said groups for a preceding cost value, which are not contained within another said group for a preceding cost value, in the currently-selected group; and any single nodes, not forming part of a said group for a preceding cost value, in the currently-selected group;

as the subset which provides the minimum number of exception bypasses in the complex node representation for the currently-selected group.

7. A method as claimed in claim 1 including generating said set of restrictive costs for the peer group prior to performing step (a).

8. A method of distributing topology data in a PNNI network system, the system including a peer group of nodes, including a plurality of border nodes, for which a set of restrictive costs, defining the restrictive costs of respective paths between pairs of the border nodes, is stored in the system, the method comprising:

generating an optimal complex node representation of the peer group, the optimal complex node representation being a representation of the peer group in which at least some of the border nodes are connected to a nucleus by respective spokes and a connection between a pair of the border nodes is represented by an exception bypass; and transmitting topology data, indicative of the complex node representation generated for the peer group, to at least one node of the network system outside the peer group;

wherein the complex node representation is generated by:

(a) for each cost value C in said set of restrictive costs, defining one or more groups of said border nodes such that, for any arrangement of border nodes in said group, the restrictive cost of a plurality of paths to connect the nodes in the group along a line is equal to C;

(b) ordering said groups in order of said cost value C;

(c) selecting a first group and a plurality of additional groups group and generating a group complex node representation for each selected group by:

(c1) selecting a subset of the nodes within the selected group, said subset comprising either a single node or a subgroup which has not previously been defined as a subset for said first group or for one of said additional groups, whereby said selected group comprises said subset and at least one remaining node;

(c2) generating a subset complex node representation for said subset;

(c3) for each of said at least one remaining node, defining a spoke of cost C for one node and defining a spoke of cost V≧C for each other node greater than one;

(c4) for each of said at least one remaining node defining exception bypasses connecting any remaining nodes in the group to form a spanning tree, each exception bypass having a cost equal to the restrictive cost of the path between the pair of border nodes connected thereby;

(c5) incorporating the subset complex node representation of said subset of nodes with said spokes and exception bypasses to form a group complex node representation; and (d) storing the group complex node representation for the last group selected in step (b) as the optimal complex node representation for the peer group.

9. A method of selecting a path for routing a call in a PNNI network system, the system including a peer group of nodes, including a plurality of border nodes, for which a set of restrictive costs, defining the restrictive costs of respective paths between pairs of the border nodes, is stored in the system, the method comprising:

generating an optimal complex node representation of the peer group, the optimal complex node representation being a representation of the peer group in which at least some of the border nodes are connected to a nucleus by respective spokes and a connection between a pair of the border nodes is represented by an exception bypass;

transmitting topology data, indicative of the complex node representation generated for the peer group, to at least one node of the network system outside the peer group; and at said node of the network system outside the peer group, selecting a path for routing of a call between a sending node of the system and a receiving node of the system, which receiving node is reachable from the sending node via said peer group, in dependence on the complex node representation;

wherein the optimal complex node representation is generated by:

(a) for each cost value C in said set of restrictive costs, defining one or more groups of said border nodes such that, for any arrangement of border nodes in said group, the restrictive cost of a plurality of paths to connect the nodes in the group along a line is equal to C;

(b) ordering said groups in order of said cost value C;

(c) selecting a first group and a plurality of additional groups group and generating a group complex node representation for each selected group by:

(c1) selecting a subset of the nodes within the selected group, said subset comprising either a single node or a subgroup which has not previously been defined as a subset for said first group or for one of said additional groups, whereby said selected group comprises said subset and at least one remaining node;

(c2) generating a subset complex node representation for said subset;

(c3) for each of said at least one remaining node, defining a spoke of cost C for one node and defining a spoke of cost V≧C for each other node greater than one;

(c4) for each of said at least one remaining node defining exception bypasses connecting any remaining nodes in the group to form a spanning tree, each exception bypass having a cost equal to the restrictive cost of the path between the pair of border nodes connected thereby;

(c5) incorporating the subset complex node representation of said subset of nodes with said spokes and exception bypasses to form a group complex node representation; and (d) storing the group complex node representation for the last group selected in step (b) as the optimal complex node representation for the peer group.

10. Apparatus for generating an optimal complex node representation of a peer group of nodes, including a plurality of border nodes, in a PNNI network system, the optimal complex node representation being a representation of the peer group in which at least some of the border nodes are connected to a nucleus by respective spokes and a connection between a pair of the border nodes is represented by an exception bypass, the apparatus comprising memory for storing a set of restrictive costs, defining the restrictive costs of respective paths between pairs of the border nodes, and control logic configured to:

(a) for each cost value C in said set of restrictive costs, define one or more groups of said border nodes such that, for any arrangement of border nodes in said group, the restrictive cost of a plurality of paths to connect the nodes in the group along a line is equal to C;

(b) order said groups in order of said cost value C;

(c) select a first group and a plurality of additional groups group and generate a group complex node representation for each selected group by:

(c1) selecting a subset of the nodes within the selected group, said subset comprising either a single node or a subgroup which has not previously been defined as a subset for said first group or for one of said additional groups, whereby said selected group comprises said subset and at least one remaining node;

(c2) generating a subset complex node representation for said subset;

(c3) for each of said at least one remaining node, defining a spoke of cost C for one node and defining a spoke of cost V≧C for each other node greater than one;

(c4) for each of said at least one remaining node defining exception bypasses connecting any remaining nodes in the group to form a spanning tree, each exception bypass having a cost equal to the restrictive cost of the path between the pair of border nodes connected thereby;

(c5) incorporating the subset complex node representation of said subset of nodes with said spokes and exception bypasses to form a group complex node representation; and (d) to store the group complex node representation for the last group selected in step (b) as the optimal complex node representation for the peer group.

11. Apparatus as claimed in claim 10 wherein the control logic is configured to select said groups in step (b) in order of increasing cost value.

12. Apparatus as claimed in claim 10 wherein the control logic is configured to define said exception bypasses in step (c3) such that the exception bypasses connect said remaining nodes form a spanning line.

13. Apparatus as claimed in claim 10 wherein the control logic is configured to perform step (a) by, for each cost value C:

(a1) identifying all pairs of the border nodes for which said restrictive cost of the path between the pair of border nodes is C;

(a2) grouping the nodes of all pairs identified in step (a1) to define said one or more groups.

14. Apparatus as claimed in claim 10 wherein the control logic is configured such that, in step (a), said groups are defined in said order of cost value C, and wherein the control logic is configured to perform steps (b) and (c) in parallel with step (a).

15. Apparatus as claimed in claim 10 wherein the control logic is configured to select said subset in step (c) from:
   any said groups for a preceding cost value, which are not contained within another said group for a preceding cost value, in the currently-selected group; and
   any single nodes, not forming part of a said group for a preceding cost value, in the currently-selected group;
as the subset which provides the minimum number of exception bypasses in the complex node representation for the currently-selected group.

16. Apparatus as claimed in claim 10 wherein the control logic is further configured to generate said set of restrictive costs for the peer group prior to performing step (a), and to store the memory.

17. A device for connection in a PNNI network system as a node of a peer group of nodes for which a set of restrictive costs, defining the restrictive costs of respective paths between pairs of the border nodes, is stored in the system, the device comprising apparatus for generating an optimal complex node representation of a peer group of nodes, including a plurality of border nodes, in a PNNI network system, the optimal complex node representation being a representation of the peer group in which at least some of the border nodes are connected to a nucleus by respective spokes and a connection between a pair of the border nodes is represented by an exception bypass, the apparatus comprising memory for storing a set of restrictive costs, defining the restrictive costs of respective paths between pairs of the border nodes, and control logic configured to:
   (a) for each cost value C in said set of restrictive costs, define one or more groups of said border nodes such that, for any arrangement of border nodes in said group, the restrictive cost of a plurality of paths to connect the nodes in the group along a line is equal to C;
   (b) order said groups in order of said cost value C;
   (c) select a first group and a plurality of additional groups group and generate a group complex node representation for each selected group by:
      (c1) selecting a subset of the nodes within the selected group, said subset comprising either a single node or a subgroup which has not previously been defined as a subset for said first group or for one of said additional groups, whereby said selected group comprises said subset and at least one remaining node;
      (c2) generating a subset complex node representation for said subset;
      (c3) for each of said at least one remaining node, defining a spoke of cost C for one node and defining a spoke of cost $V \geq C$ for each other node greater than one;
      (c4) for each of said at least one remaining node defining exception bypasses connecting any remaining nodes in the group to form a spanning tree, each exception bypass having a cost equal to the restrictive cost of the path between the pair of border nodes connected thereby;
      (c5) incorporating the subset complex node representation of said subset of nodes with said spokes and exception bypasses to form a group complex node representation; and
   (d) to store the group complex node representation for the last group selected in step (b) as the optimal complex node representation for the peer group.

18. A PNNI network system comprising a plurality of nodes, at least one of said nodes comprising a device for connection in a PNNI network system as a node of a peer group of nodes for which a set of restrictive costs, defining the restrictive costs of respective paths between pairs of the border nodes, is stored in the system, the device comprising apparatus for generating an optimal complex node representation of a peer group of nodes, including a plurality of border nodes, in a PNNI network system, the optimal complex node representation being a representation of the peer group in which at least some of the border nodes are connected to a nucleus by respective spokes and a connection between a pair of the border nodes is represented by an exception bypass, the apparatus comprising memory for storing a set of restrictive costs, defining the restrictive costs of respective paths between pairs of the border nodes, and control logic configured to:
   (a) for each cost value C in said set of restrictive costs, define one or more groups of said border nodes such that, for any arrangement of border nodes in said group, the restrictive cost of a plurality of paths to connect the nodes in the group along a line is equal to C;
   (b) order said groups in order of said cost value C;
   (c) select a first group and a plurality of additional groups group and generate a group complex node representation for each selected group by:
      (c1) selecting a subset of the nodes within the selected group, said subset comprising either a single node or a subgroup which has not previously been defined as a subset for said first group or for one of said additional groups, whereby said selected group comprises said subset and at least one remaining node;
      (c2) generating a subset complex node representation for said subset:
      (c3) for each of said at least one remaining node, defining a spoke of cost C for one node and defining a spoke of cost $V \geq C$ for each other node greater than one;
      (c4) for each of said at least one remaining node defining exception bypasses connecting any remaining nodes in the group to form a spanning tree, each exception bypass having a cost equal to the restrictive cost of the path between the pair of border nodes connected thereby;
      (c5) incorporating the subset complex node representation of said subset of nodes with said spokes and exception bypasses to form a group complex node representation; and
   (d) storing the group complex node representation for the last group selected in step (b) as the optimal complex node representation for the peer group.

19. A computer program product, readable by a processor of a device for connection in a PNNI network system as a node in a peer group of nodes, including a plurality of border nodes, for which a set of restrictive costs, defining the restrictive costs of respective paths between pairs of the border nodes, is stored in the system, said product comprising computer program code means executable by the processor to generate an optimal complex node representation of said peer group, said optimal complex node representation being a representation of the peer group in which at least some of the border nodes are connected to a nucleus by respective spokes and a connection between a pair of the border nodes is represented by an exception bypass, the computer program code means being executable by the processor to generate said optimal complex node representation by performing the steps of:

(a) for each cost value C in said set of restrictive costs, defining one or more groups of said border nodes such that, for any arrangement of border nodes in said group, the restrictive cost of a plurality of paths to connect the nodes in the group along a line is equal to C;

(b) ordering said groups in order of said cost value C;

(c) selecting a first group and a plurality of additional groups group and generating a group complex node representation for each selected group by:

(c1) selecting a subset of the nodes within the selected group, said subset comprising either a single node or a subgroup which has not previously been defined as a subset for said first group or for one of said additional groups, whereby said selected group comprises said subset and at least one remaining node;

(c2) generating a subset complex node representation for said subset;

(c3) for each of said at least one remaining node, defining a spoke of cost C for one node and defining a spoke of cost $V \geq C$ for each other node greater than one;

(c4) for each of said at least one remaining node defining exception bypasses connecting any remaining nodes in the group to form a spanning tree, each exception bypass having a cost equal to the restrictive cost of the path between the pair of border nodes connected thereby;

(c5) incorporating the subset complex node representation of said subset of nodes with said spokes and exception bypasses to form a group complex node representation; and (d) storing the group complex node representation for the last group selected in step (b) as the optimal complex node representation for the peer group.

* * * * *